Figures 1, 2, 3, 4, 5, 6, 7, 8:
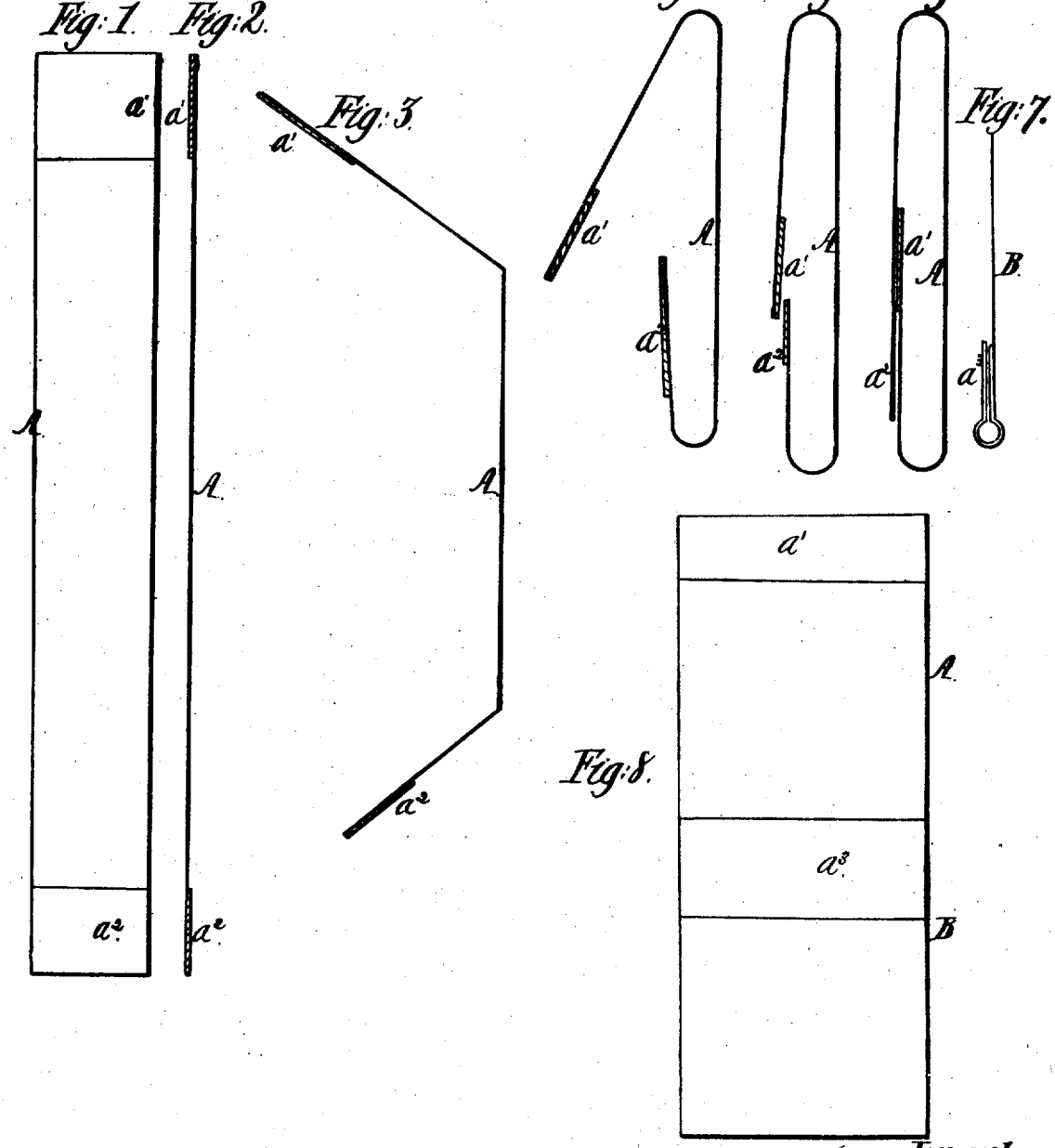

E. M. Carrington.

Rubber Bands.

No. 3,260. Reissued Jan. 12, 1869.

Witnesses:
Chas. G. Allen
T. E. Gale

Inventor:
E. M. Carrington
Per Attorney
V. D. Gale

UNITED STATES PATENT OFFICE.

ELIJAH M. CARRINGTON, OF NEW YORK, N. Y.

IMPROVED SELF-CEMENTING BAND FOR HOLDING BANK-NOTES, PAPERS, &c.

Specification forming part of Letters Patent No. 81,339, dated August 25, 1868; Reissue No. 3,260, dated January 12, 1869.

*To all whom it may concern:*

Be it known that I, ELIJAH M. CARRINGTON, of the city, county, and State of New York, have invented certain new and useful devices for Encircling Bank-Notes, Letter-Files, Envelopes, and for other equivalent purposes not before used nor known; and I hereby declare the following to be a full and sufficient description, reference being had to the accompanying drawings and references thereon, making part of the description.

Figure 1 represents a face view of the self-cementing band opened out—A the band part; $a'$, the cemented part at one end; $a^2$, the cemented part of the other end; Fig. 2, an edge view of the same; Fig. 3, the same partly folded; Fig. 4, the same nearly folded into a band; Figs. 5 and 6, the same folded for a larger and a smaller band, and different positions of the cemented surface; Fig. 7, the band-strip used as a tag and folded upon itself at the cemented end; Fig. 8, the section of a portion of the band stuff cemented in strips by hand or by machinery; B, portion used for tags.

The nature of the invention consists in the preparation of a sheet-fabric in strips, sheets, and bands, cemented and partly dried, so as to adhere to each other or to other surfaces without the aid of gum, paste, or other adhering medium, simply by pressure.

The articles embraced under this device are bands or belts for encircling bank-notes, letter-files, envelopes, bank-checks, as well as small packages of goods, as gloves, hose, &c.; also for tags on bales of goods, packages, and labels, advertisements for walls, bar-rooms, show-boards, bulletin-boards, &c.

In preparing this material it was necessary that the cement be made of a material that would remain moist and sticky for a considerable time. India-rubber dissolved in benzine met this requirement. The rubber is highly soluble in the benzine, and the benzine is very volatile and rapidly escapes in the air, leaving the rubber in a sticky condition holding a part of the rubber solvent in solution. It was necessary to control this extreme sticky state by the intervention of a third substance, so that the article could be handled during the manufacture, otherwise it would adhere to uncemented as well as to cemented surfaces, and the bands would be liable to be covered by the cement in parts where it is not needed. To remedy this evil, and enable the cemented surfaces to be handled with impunity, to be cut into strips, various contrivances were suggested, as various pulverized materials, which were tried and abandoned. Various unctuous bodies were tried, spread on with a brush; but the material could not be used in this way effectually. It was then used in the solid state, and succeeded perfectly. The half-dried rubber cement, after being spread on the end part of the band, was rubbed over with a solid block of spermaceti, stearic acid, palmitin, or paraffine, and especially the last. Enough of this unctuous body was rubbed off to prevent extreme stickiness on parts not cemented, but not enough to prevent cemented surfaces from adhering to each other. This use of an unctuous body, in combination with rubber and benzine, fulfilled the desideratum of the invention to all intents and purposes.

It was necessary to state these details to show the steps of the inventor in arriving at the result. He might have rested his case on any one of the unctuous bodies named, and, by trying all, he decided which is best, and that is paraffine. These three materials, therefore, rubber, benzine, and an unctuous body, seem to be the *sine qua non* of the cementing band.

The cement may be made by filling a wide-mouthed glass jar one-half with shreds of raw rubber, and covering and filling it to three-quarters full with good benzine. Stir it well, and cover it tight with a good cork for twenty-four hours. If successful, the solution will be like liquid-honey in the summer. The room where it is kept should be warm. If too thin to work, add more rubber. If too thick, add benzine.

To prepare the bands, tags, and sheets: The individual strips or sheets of suitable paper for bands may be cemented with a brush, as an experiment in a small way, and dried in open air; but where quantities are to be manufactured machinery must be resorted to to accomplish the work of cutting the paper and cementing the pieces, as required. I prefer to cement the paper in sheets, and afterward cut these into strips, by knives or shears, or other equivalent devices. A large number of sheets may be cemented at once by placing them lapping upon each other, which may be easily understood; but, as before stated, for work on quantities, machinery is indispensable.

The surfaces $d'$ and $d^2$ are sufficiently adhesive to adhere to plain paper when these parts are pressed strongly together; but ordinary treatment of handling will not cause a cemented surface to unite with an uncemented surface, although two cemented surfaces will adhere so firmly as to tear the paper asunder before the cement will yield.

I can use, for the purposes here named, thin leather, parchment, muslin, paper backed with muslin, vegetable parchment, and, in short, any material that is sufficiently strong and flexible, in place of the paper for the band A.

Having now fully stated the nature of the invention, and shown the various modes of using the same, what I claim as my invention, and desire to secure by Letters Patent, is—

The self-cementing band, or its equivalent fabric, made substantially in the manner and for the purpose herein set forth.

ELIJAH M. CARRINGTON.

Witnesses:
G. W. BENSON,
JAMES W. POE.